(12) United States Patent
Andersson

(10) Patent No.: US 6,581,633 B2
(45) Date of Patent: Jun. 24, 2003

(54) CHECK VALVE AND METHOD OF FABRICATION

(75) Inventor: Bo Andersson, Cambridge, NY (US)

(73) Assignee: Flomatic Corporation, Glens Falls, NY (US)

(*) Notice: Subject to any disclaimer, the term of this patent is extended or adjusted under 35 U.S.C. 154(b) by 40 days.

(21) Appl. No.: 09/948,978

(22) Filed: Sep. 7, 2001

(65) Prior Publication Data

US 2003/0041905 A1 Mar. 6, 2003

Related U.S. Application Data

(60) Provisional application No. 60/316,398, filed on Aug. 31, 2001.

(51) Int. Cl.[7] .............................................. F16K 15/02
(52) U.S. Cl. .................... 137/541; 137/542; 137/533.21
(58) Field of Search ........................... 137/533.21, 541, 137/542; 251/333

(56) References Cited

U.S. PATENT DOCUMENTS

| 1,779,421 A | 10/1930 | Cox | |
| 2,072,271 A | 3/1937 | Meadows | 137/53 |
| 2,621,885 A | 12/1952 | Schmitt | 251/75 |
| 3,001,546 A | 9/1961 | Salisbury | 137/541 |
| 3,029,835 A | 4/1962 | Biello et al. | 137/515.5 |
| 3,294,116 A | * 12/1966 | Tremeau | 137/541 |
| 3,604,450 A | 9/1971 | Botkin | 137/493.4 |
| 3,727,636 A | * 4/1973 | Simmons | 137/541 |
| 4,129,144 A | 12/1978 | Andersson et al. | 137/541 |
| 4,176,681 A | 12/1979 | Mackal | 137/516.29 |
| 4,273,153 A | 6/1981 | Brown | 137/454.5 |
| 4,294,281 A | 10/1981 | Gerdes | 137/541 |
| 4,545,404 A | * 10/1985 | Redwine | 137/516.29 |
| 4,941,503 A | 7/1990 | Hubner, Jr. | 137/454.2 |
| 4,971,093 A | 11/1990 | Andersson | 137/541 |
| 5,171,136 A | * 12/1992 | Pacht | 417/571 |
| 5,176,171 A | 1/1993 | Andersson | 137/512 |
| 5,617,893 A | 4/1997 | Webster | 137/526 |

* cited by examiner

Primary Examiner—Michael Powell Buiz
Assistant Examiner—Ramesh Krishnamurthy
(74) Attorney, Agent, or Firm—Heslin Rothenberg Farley & Mesiti P.C.

(57) ABSTRACT

A check valve comprising a casing having a flange extending circumferentially around the inner periphery of the body. The flange is constructed by first drilling from a first direction at a diameter less than the predetermined diameter and then drilling from an opposite direction at the predetermined diameter. The flange defines a valve aperture for receiving a poppet valve. The poppet valve includes a stem including a plurality of legs each having an outer peripheral surface facing the valve aperture. The outer peripheral surface of the valve legs have rounded or recessed edges such that only a center portion of the outer peripheral surface of the legs can come into contact with the inner surface defining the valve aperture.

19 Claims, 5 Drawing Sheets

CHECK VALVE AND METHOD OF FABRICATION

RELATED APPLICATION

This non-provisional application is related to and claims priority to a provisional application No. 60/316,398 filed on Aug. 31, 2001 by Bo Andersson entitled "Check Valve and Method of Fabrication", the entire contents of which is incorporated herein by reference.

FIELD OF THE INVENTION

This invention relates generally to valves, and more particularly, to a check valve with an improved design and construction of a poppet valve and aperture supporting the poppet valve within the check valve.

BACKGROUND OF THE INVENTION

Check valves are designed to permit the flow of fluid in one direction while preventing the fluid from flowing in the reverse direction. Conventional check valves utilize a single poppet valve within a body which controls the flow of fluid therethrough.

However, conventional poppet valves are likely to become lodged in the interior seat provided by an annular flange within the valve body. When this happens, it is almost impossible to dislodge the poppet valve without dismantling the check valve or utilizing a new fitting. Moreover, the current construction of the interior seat for the poppet valve adds to the chance that the poppet valve will become lodged by the likelihood that burs exist on the inner surface of the flange forming the seat.

SUMMARY OF THE INVENTION

The shortcomings of the prior art may be alleviated by using a check valve in accordance with one or more principles of the present invention. The check valve of the present invention may be used in any type of hydraulic or other fluid flow lines such as, for example, water, fuel, or gas lines, wells, cisterns, pumping outfits or the like. Additionally, other uses may be made of the invention which fall within the scope of the claimed invention but which are not specifically described below.

In one aspect of the invention, there is provided a check valve comprising a body and a poppet valve moveably mounted within the body. The body is configured to permit fluid to flow therethrough. The body includes a flange extending circumferentially around the inner periphery of the body. The flange has an inner surface defining a valve aperture. The poppet valve is to be moveably mounted within the valve aperture. The poppet valve includes a plurality of guide legs extending through the valve aperture. Each of the plurality of guide legs has an outer peripheral surface facing the inner surface defining the valve aperture. The outer edges of the outer peripheral surfaces of the plurality of guide legs are rounded or recessed such that only a center portion of the outer peripheral surface of each guide leg can come into contact with the inner surface defining the valve aperture.

In another aspect of the invention there is provided a method of fabricating an outer casing for a check valve. The method comprises drilling from a first direction with a center diameter slightly less than a pre-determined diameter of a valve aperture within which a poppet valve is moveably mounted and drilling from an opposite direction with a diameter equal to the pre-determined diameter. The first direction may be from a downstream portion of the casing towards an upstream portion of the casing.

Additional advantages are provided through the provision of a check valve having a poppet valve with legs having outer surfaces with rounded or recessed edges and a valve seat with rounded shoulder portions constructed by the method described and claimed herein. The check valve and method of constructing the check valve described and claimed herein assure smooth operation of the check valve by preventing the poppet valve from becoming lodged in the valve aperture, e.g., due to sharp edges on the legs of the poppet valve or burs existing on its inner diameter.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE EMBODIMENTS OF THE INVENTION

Presented herein is an improved check valve which provides an enhanced poppet valve and fabrication method for manufacturing a valve seat for the poppet valve. The enhanced poppet valve includes legs having outer surfaces with rounded or recessed edges. The fabrication method provides a flange having a smooth guide inner surface defining a valve aperture for the poppet valve during operation by reducing the existence of burs on a lower portion of the flange. The improved check valve assures smooth operation by preventing the poppet valve from becoming lodged within the check valve.

Conventional check valves have a tubular valve casing and a poppet valve mating with a valve aperture formed by a flange on the inner surface of the valve casing. The poppet valve opens and closes the valve aperture depending on the pressure differential upstream and downstream of the check valve.

Conventional poppet valves utilize a valve stem having a plurality of legs extending downwardly through the valve aperture defined by the flange from a valve head to aid in guiding the poppet valve in its opening and closing movements in the valve aperture. Two examples of check valves having this configuration are described in more detail in U.S. Pat. No. 3,001,546 to Salisbury and U.S. Pat. No. 4,129,144 to Andersson et al which are hereby incorporated herein by reference.

Figure 6:
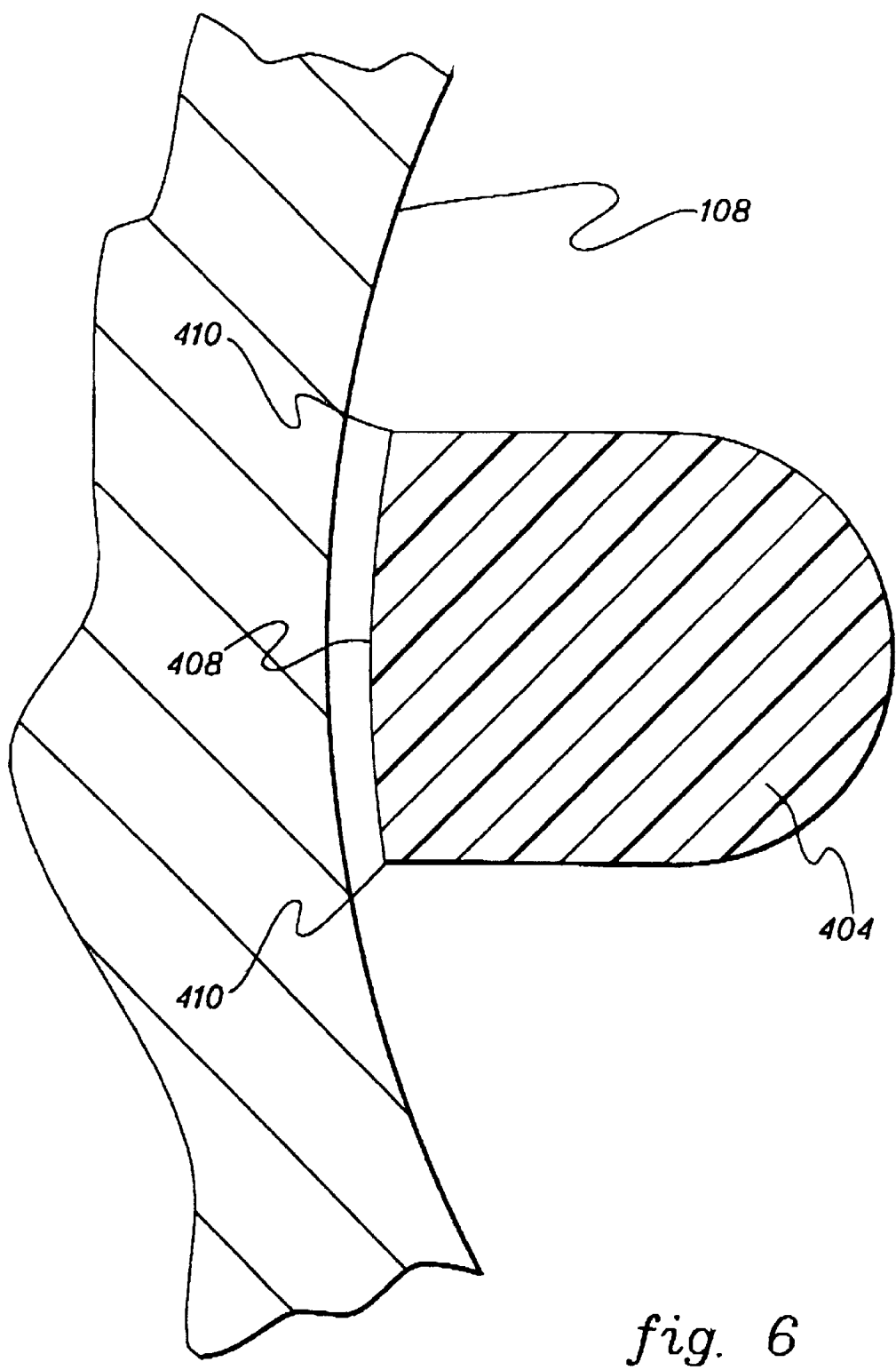
FIG. 6 depicts a partial cross sectional view of a conventional check valve illustrating the relationship the outer peripheries or surfaces of the guide legs of a poppet valve having sharp edges and the inner surface defining the valve aperture in accordance with the principles of the present invention.

As illustrated in FIG. 6, the outer peripheries or surfaces 408 of the guide legs 404 of the poppet valve are formed on the arc of a circle having a diameter slightly less than the inner diameter of the valve aperture defined by the flange. However, the entire outer surface of each leg of the poppet valve may come into contact with the inner surface, causing high friction during operation. Moreover, these surfaces 408 have sharp edges 410 which can catch on the inner surface of the valve aperture during operation, particularly if a bur exists on this inner surface. Further, during operation, conventional poppet valve have a tendency to rotate or otherwise twist in the valve aperture causing the sharp edges of the outer legs of the poppet valve to dig into the inner surface of the valve aperture. All of these conditions may effect the smooth operation of the check valve, particularly with respect to the opening and closing movement of the poppet valve in the valve aperture within the check valve casing.

The conventional construction of the valve seat in the casing has also effected the smooth operation of the check valve. The valve seat within the casing of the prior art check valves is formed by drilling from only one direction (e.g. downstream end towards upstream end of casing). This one direction drilling causes a sharp shoulder to form on the edge of the flange opposite the entry of the drill into the flange. The drilling is then followed by extensive polishing steps to remove the burs remaining on the inner diameter of the flange. However, the polishing steps to remove the burs are not completely successful. A bur can still exist along the edges of the flange which the poppet valve may catch on or cause the poppet valve to get lodged in the valve aperture.

Figure 1:
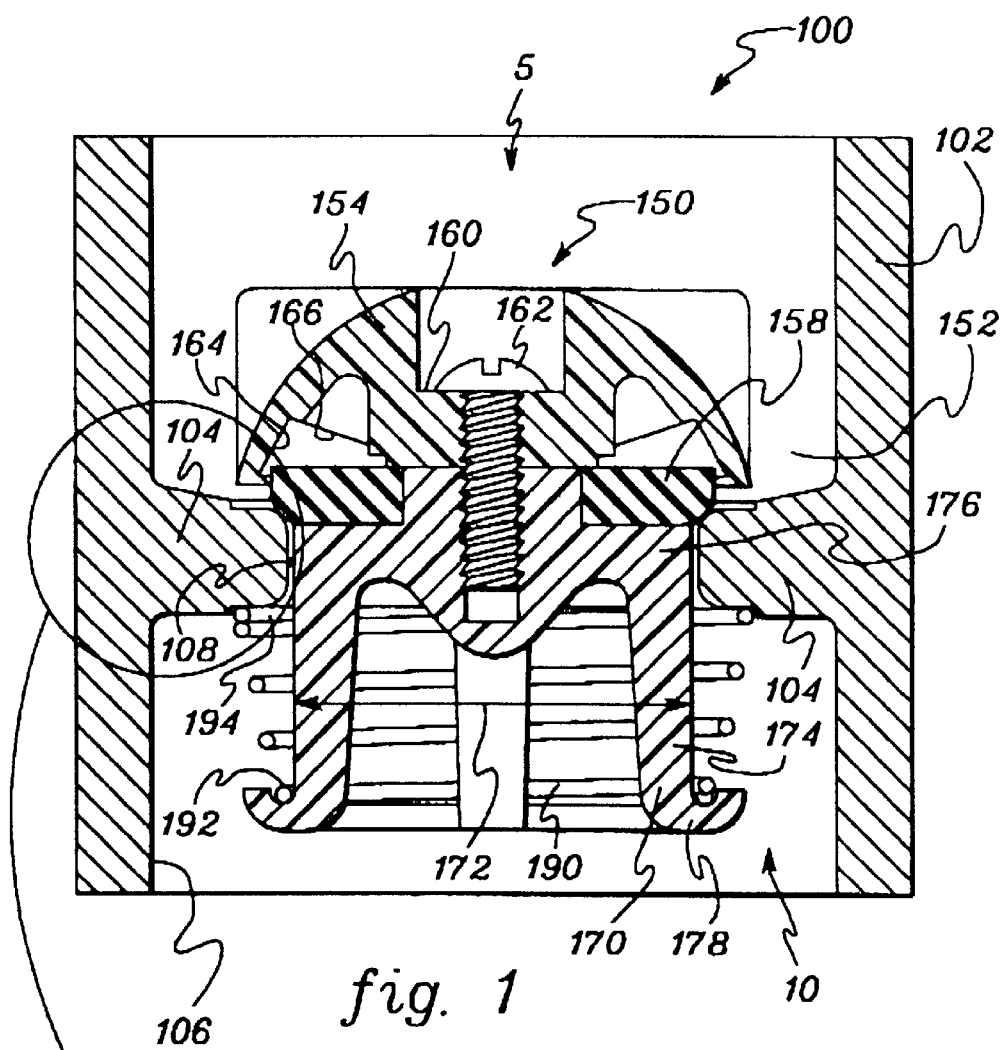
FIG. 1 depicts a longitudinal cross sectional view through a check valve constructed in accordance with the principles of the present invention, and illustrating the valve in a closed position.

In the illustrative embodiment shown in FIG. 1, a check valve 100 includes a tubular body or casing 102 containing a poppet valve 150 in accordance with the principles of the present invention. The ends (not shown) of tubular casing 102 may be internally threaded or otherwise adapted to facilitate connection of check valve 100 with adjacent portions of a hydraulic flow line. Tubular casing 102 may be slightly increased in diameter inwardly of the end portions to provide a valve chamber in the casing for supporting poppet valve 150.

Figure 2:
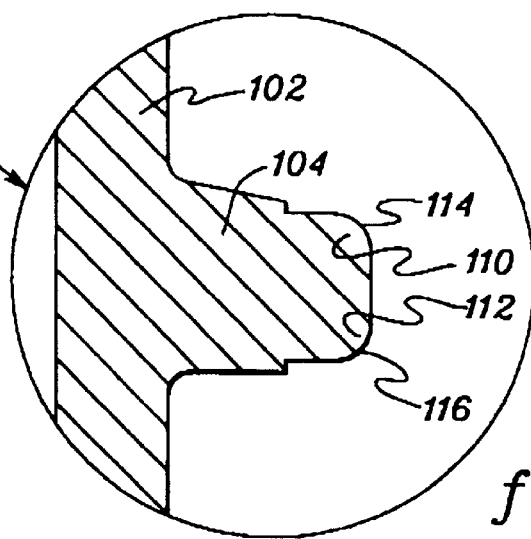
FIG. 2 depicts a fragmentary sectional view illustration the flange of FIG. 1 forming the valve seat for a poppet valve in accordance with the principles of the present invention.

Within tubular casing 102 an inwardly extending circumferential flange 104 protruding from inner surface 106 of the casing forms a valve aperture 108. Flange 104 also effectively separates the valve chamber defined by casing 102 of the valve into an upper or downstream portion 5 and a lower or upstream portion 10. Typically, inner flange 104 is circular in shape as defined by its inner surface forming valve aperture 108. However, aperture 108 is not limited to any particular geometrical shape. As illustrated in FIG. 2, flange 104 includes upper and lower shoulder portions 110, 112 respectively having rounded edges 114, 116.

A flange 104 fabricated in accordance with the present invention is formed by drilling the casing from opposite directions (e.g. from upper portion 5 towards lower portion 10 and from lower portion 10 towards upper portion 5) in order to eliminate any burs especially on the upstream shoulder portion 113 that may exist in prior art valves formed by drilling from a single direction. In one embodiment, the valve is drilled in a first direction, preferably upper or downstream portion 5 towards lower or upstream portion 10, with a center diameter slightly less than a predetermined, desired diameter for the valve aperture 108 in the middle of the seat within which the poppet valve is to reside. For example, the casing is first drilled with an aperture diameter of about 0.008 inches less than the desired diameter, although a diameter ranging between about 0.005 inches to 0.015 inches less than the desired diameter may be used. The valve is then drilled from the opposite direction, or from the lower or upstream portion towards the upper or downstream portion, with a diameter equal to the predetermined, desired diameter of the valve aperture 108 to push any potential bur off upper shoulder portion 110 of flange 104 which may be subsequently polished out. The result is a more rounded valve seat in upper and lower shoulder portions 110, 112 of the flange, as shown in FIG. 2, which significantly reduces the need for the extensive, polishing steps as in the past, and, more significantly, prevents poppet valve 150 from sticking during operation. A bur on upper shoulder portion 110 of flange 104 is less critical than on lower shoulder portion 112 because the leverage point of the poppet valve with the flange is moved almost to the contact point.

Figure 3:
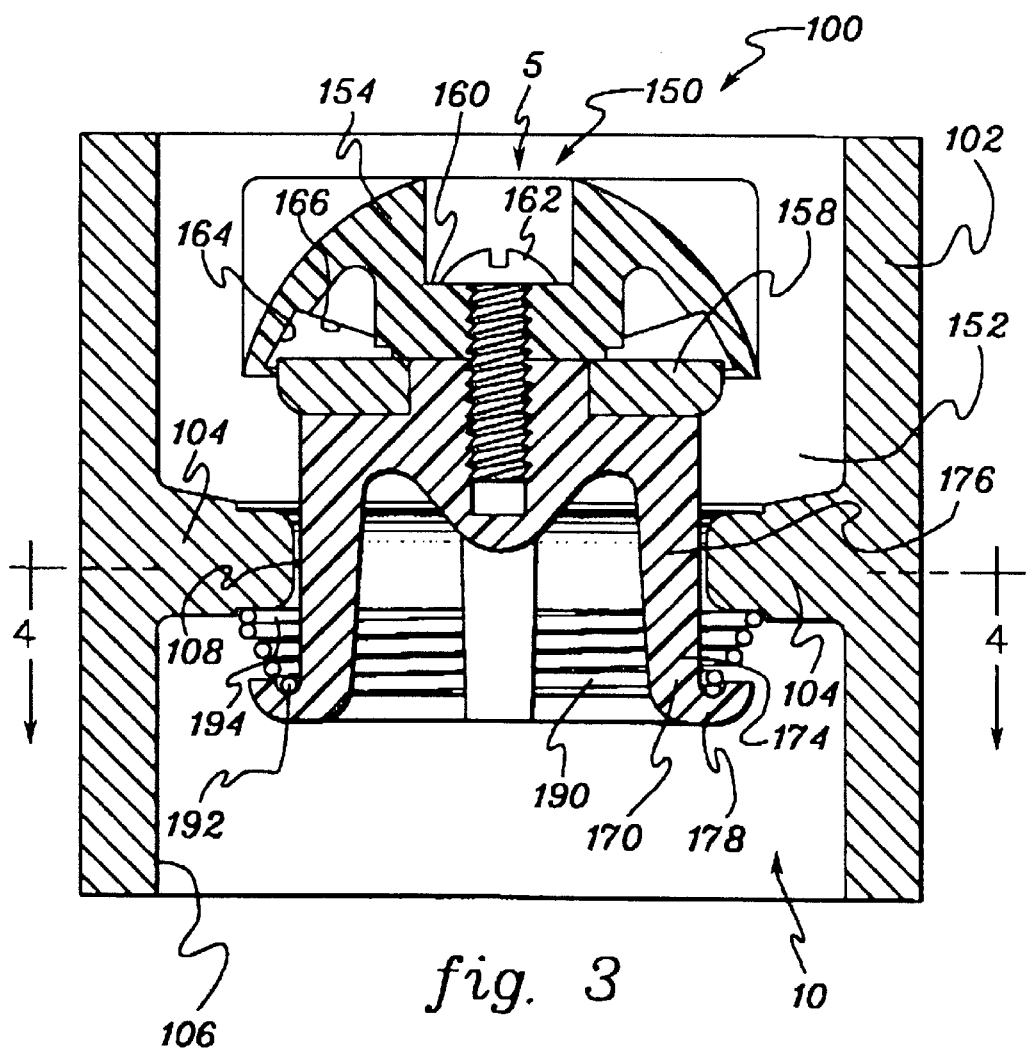
FIG. 3 depicts a longitudinal cross sectional view through a check valve constructed in accordance with the principles of the present invention, and illustrating the valve in an open position.

Poppet valve 150 is moveably mounted within valve aperture 108 formed by flange 104 between a closed position (as depicted FIG. 1) and an open position (as depicted in FIG. 3). Poppet valve 150 utilizes flange 104 as a valve seat and, when seated on the flange, is coaxially aligned with the axis of valve aperture 108. Flange 104 also supports and guides poppet valve 150 during operation.

As illustrated in FIG. 1, poppet valve 150 comprises a valve body 152 including a head 154 in upper or downstream portion 5 of casing 102 and a stem 170 extending through valve aperture 108 and into lower or upstream portion 10 of the tubular casing 102. Head 154 includes a rubber disc 158 having a greater diameter than the diameter of valve aperture 108 to cover valve aperture when closed. Disc 158 cooperates with upper shoulder portion 110 of flange 104 to seal the valve closed and to aid in centering the poppet valve 150. Head 154 includes a flattened apex 160 which provides for a flat headed threaded member 162 extending through a central bore in head 154 and disc 158 to thread into stem 170.

The edge of the base of head 154 is annular having a diameter greater than the diameter of the valve seat. Head 154 is provided with an annular groove facing upstream and including a pair of side walls 164, 166. The bottom tapers (as shown in FIG. 1) at an angle with respect to the axis of the head so as to provide a tapering groove together with side wall 164. Tapering groove 162 is adapted to evenly receive the distorted circumference of disc 158 to prevent it from becoming jammed in valve aperture 108 when the valve is closed. Head 154 contacts the flange just inside of the outer periphery of the valve seat, thus mechanically and positively stopping the progress of poppet valve 150. Flat face 160 of head 154 supporting threaded member 162 receives the blunt of the retropressure stabilizing entire poppet valve 150 and eliminating flutter and gyration of the poppet valve 150 during operation.

Stem 170 of poppet valve 150 has an outer diameter 172 that is slightly smaller than valve aperture 108 to prevent poppet valve 150 from becoming lodged in the aperture. In the embodiment shown, stem 170 includes a plurality of circumferentially spaced, longitudinal legs or wings 174 extending between a base 176 and a continuous annular ring 178 which has a recess facing upstream for the purpose of providing a reaction point for the circular end of a compression spring 190. Each of legs 174 includes an outer peripheral surface 180 facing the inner surface of the valve aperture formed by flange 104 to aid in guiding the reciprocating movement of poppet valve 150 within casing 102. As head 154 is moved back and forth in its opening and closing movements, legs 174 cooperate with valve aperture 108 to maintain head 154 substantially in alignment with the valve seat.

Figure 4:
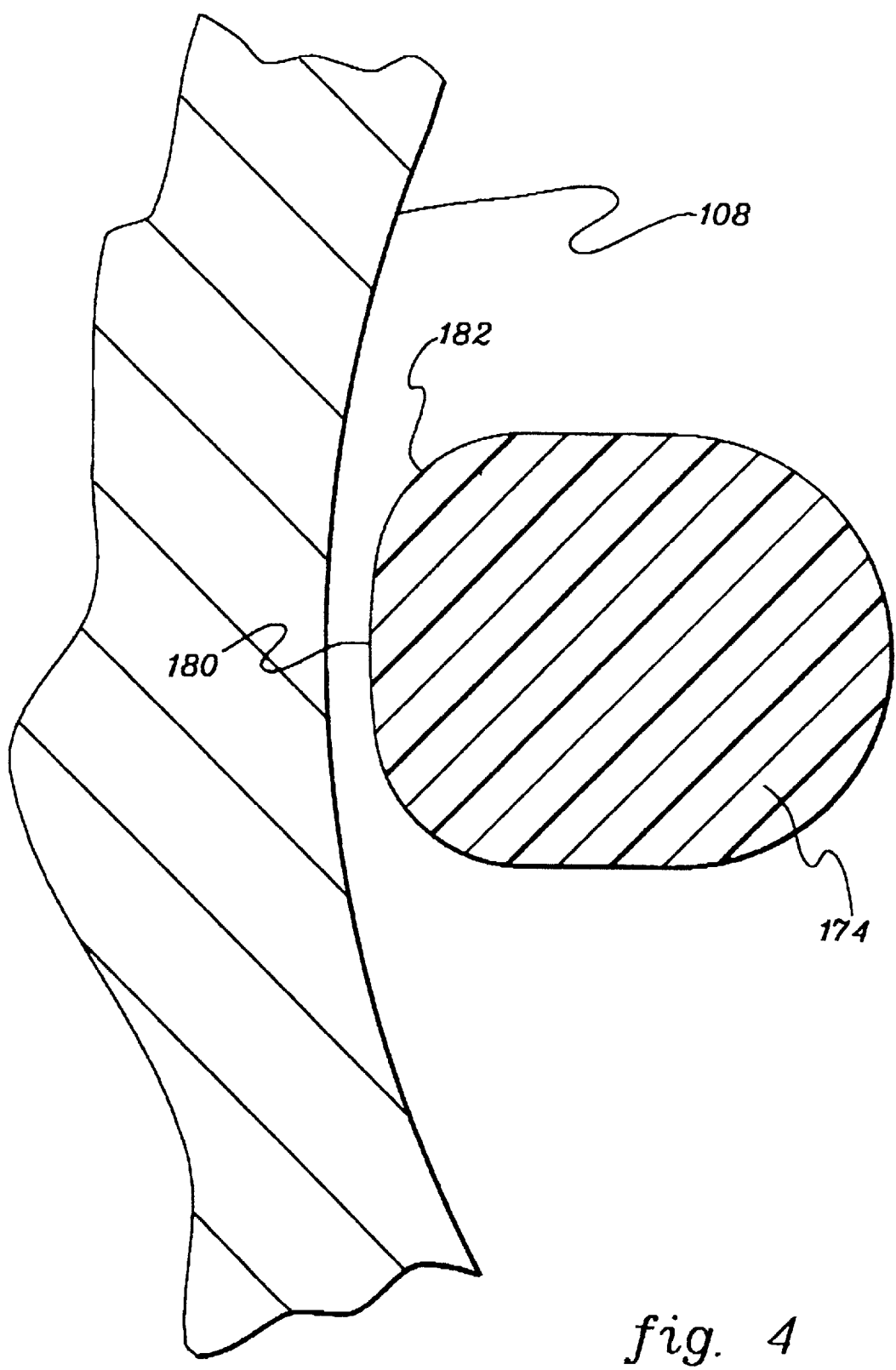
FIG. 4 depicts a partial cross sectional view taken along the line 4—4 in FIG. 3 illustrating the relationship between one embodiment of the outer peripheries or surfaces of the guide legs of a poppet valve having rounded edges and the inner surface defining the valve aperture in accordance with the principles of the present invention.

Outer peripheral surface 180 of each leg 174, which may be formed on the arc of a circle having a diameter slightly less than the inner diameter of valve aperture 108, does not have any sharp edges. Instead, each of these surfaces 180 may have rounded edges 182 as illustrated in FIG. 4, such that only a center portion, not the entire, of outer surface 180 of each leg 174 contacts the inner surface of flange 104 defining valve aperture 108. This can be achieved, for example, by rounding off sharp edges 410 of the poppet valve design illustrated in FIG. 6 or by providing each outer surface of leg 174 with a convex wear surface extending towards the inner surface of valve aperture 108 such that the edges of the wear surface extend radially away from the inner surface of the flange defining the valve aperture. In other words, the outer surface of each leg 174 has a convex surface that curves outwardly more than the arc defining valve aperture 108 curves inwardly.

Figure 5:
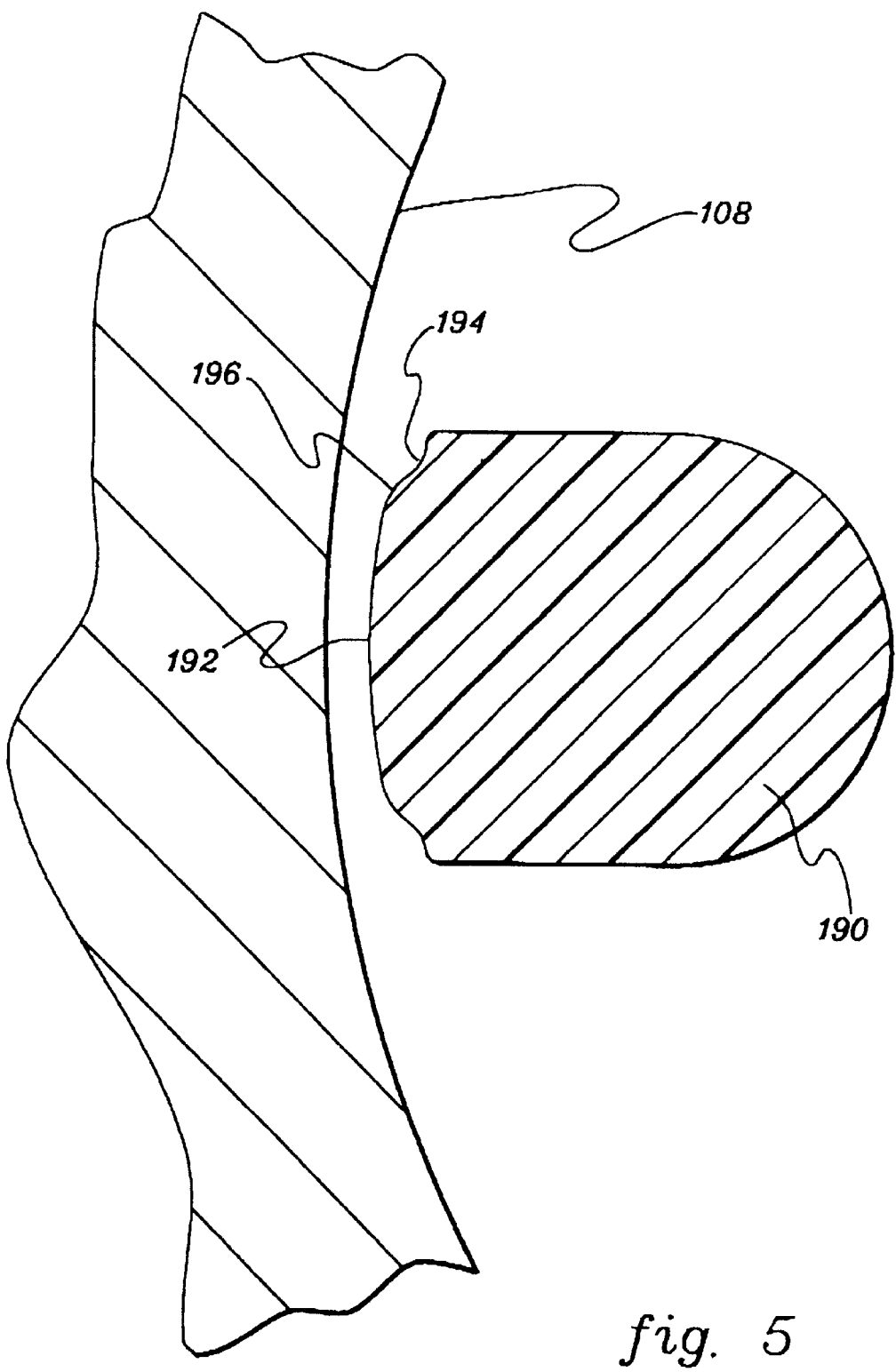
FIG. 5 depicts a partial cross sectional view taken along the line 4—4 in FIG. 3 illustrating the relationship between another embodiment of the outer peripheries or surfaces of the guide legs of a poppet valve having recessed edges and the inner surface defining the valve aperture in accordance with the principles of the present invention.

Alternatively, the edges or outer portions of the outer surfaces of the legs shown in FIG. 6 are recessed back such that only a center portion 192 of the outer surface of the legs can come into contact with the inner surface defining the valve aperture, as illustrated in FIG. 5. In this embodiment, the outer portions 194 of the outer surfaces of the legs are recessed or cut out or away and the inner edges 196 remaining may be rounded. The outermost edges should be recessed back far enough so that they never come into contact with the inner surface 108 defining the valve aperture.

In one embodiment, the arc formed by the valve aperture 108 is tangent to the individual peripheral surfaces 180 of legs 174 such that each leg 174 contacts the inner casing surface defining valve aperture 108 at a line. Although, if the contact between the outer surface of the legs and inner surface defining the valve aperture is too minimal, then dirt or other potential contaminants may jam or lodge the poppet valve within the check valve. Therefore, it is desirable that a portion, such as the center portion 192, illustrated in FIG. 5, or the center portion illustrated in FIG. 4, of the outer surface of the legs remain to come into contact with the inner surface defining the valve aperture.

Rounded edges 182, as shown in FIG. 4, or recessed edges, as shown in FIG. 5, permit legs 174 to easily hop over or otherwise avoid becoming lodged on any burs that may exist on the inner surface of valve aperture 108. Additionally, a lesser amount of outer surface 180 of each leg 174 contacts the inner casing surface defining valve aperture 108, as compared to prior art designs, thus reducing the friction caused by this contact during operation. Further, the rounded off or recessed edges allow legs 174 of poppet valve 150 to move up and down in valve aperture 108 as intended while not digging into or damaging the inner surface of the flange defining valve aperture 108 as the poppet valve rotates or otherwise twists during operation.

Poppet valve 150, and particularly head 154, is maintained in position by an elastomeric spring means 190 such as, for example, a stainless steel coil spring. Spring 190 is telescoped over guide legs 174. A first end 192 of spring 190 is supported or, alternatively, anchored against retaining ring 178 formed at the ends of legs 174. Opposite end 194 of spring 190 is supported or, alternatively, anchored against the outer periphery of stem 170 or the lower shoulder portion of flange 102 to constantly react on retaining ring 178 and bias valve head 154 to a closed position. In one embodiment, an anti-spin lug may be used to anchor opposite end 194 on the lower shoulder portion of flange 102.

The valve operates in the usual manner of a check valve to provide an opening in the valve when the pressure in upstream portion 10 of valve casing 102 is sufficient to overcome the force imposed on valve head 154 by spring means 190 and to be closed by action of spring means 190 when the pressure upstream of the valve is decreased. When the valve opens and fluid is passing through valve aperture 108 and the openings between legs 174 of poppet valve 150, disc 158 is completely removed from flange 102. As valve head 154 is moved back and forth in its opening and closing movements, guide legs 174 cooperate with the valve aperture defined by flange 102 to maintain valve head 154 substantially in alignment of the valve seat. Rounded edges 182 or the recessed edges 194 of the outer surfaces of the guide legs of the poppet valve assure the smooth operation of the poppet valve within the valve aperture during its opening and closing movements. Rounded shoulder portions 110, 112 and method of constructing flange 102 described herein also serve to assure smooth operation of the check valve.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A check valve comprising:
   a body configured to permit fluid to flow therethrough, said body including a flange extending circumferentially around the inner periphery of the body, the flange having an inner surface defining a valve aperture; and
   a poppet valve moveably mounted within the valve aperture, said poppet valve including a plurality of guide legs extending through the valve aperture, each of the plurality of guide legs having an outer peripheral surface facing the inner surface defining the valve aperture, wherein outer edges of the outer peripheral surfaces of the plurality of guide legs are rounded such that only a center portion of the outer peripheral surface of each guide leg can come into contact with the inner surface defining the valve aperture.

2. The check valve of claim 1, wherein the outer peripheral surfaces of the plurality of legs contact the inner surface defining the valve aperture at a line contact.

3. The check valve of claim 1, wherein the outer peripheral surfaces of the plurality of legs curve outwardly more than the inner surface defining the valve aperture curves inwardly.

4. The check valve of claim 1, wherein the flange includes a rounded upper shoulder portion and a rounded lower shoulder portion.

5. The check valve of claim 4, wherein the poppet valve includes a head which contacts the upper shoulder portion of the flange when the poppet valve is in a closed position.

6. The check valve of claim 5, wherein the head of the poppet valve includes a rubber disc which contacts the upper shoulder portion of the flange.

7. The check valve of claim 1 further comprising spring means for biasing the poppet valve towards a closed position.

8. The check valve of claim 7, wherein the spring means is a coil spring.

9. The check valve of claim 1, wherein the check valve is used in a fluid flow line for water, oil or gasoline.

10. A check valve comprising:
   a body configured to permit fluid to flow therethrough, said body including a flange extending circumferentially around the inner periphery of the body, the flange having an inner surface defining a valve aperture; and
   a poppet valve moveably mounted within the valve aperture, said poppet valve including a plurality of guide legs extending through the valve aperture, each of the plurality of guide legs having an outer peripheral surface facing the inner surface defining the valve aperture, wherein each of the outer peripheral surfaces of the plurality of legs have a convex wear surface extending towards the inner surface defining the valve aperture, wherein outer edges of the convex wear surface do not come into contact with the inner surface.

11. The check valve of claim 10, wherein the convex wear surfaces of the plurality of legs contact the inner surface defining the valve aperture at a line contact.

12. The check valve of claim 10, wherein the flange includes a rounded upper shoulder portion and a rounded lower shoulder portion.

13. The check valve of claim 12, wherein the poppet valve includes a head which contacts the upper shoulder portion of the flange when the poppet valve is in a closed position.

14. The check valve of claim 13, wherein the head of the poppet valve includes a rubber disc which contacts the upper shoulder portion of the flange.

15. The check valve of claim 10 further comprising spring means for biasing the poppet valve towards a closed position.

16. The check valve of claim 15, wherein the spring means is a coil spring.

17. The check valve of claim 10, wherein the check valve is used in a fluid flow line for water, oil or gasoline.

18. A check valve comprising:
   a body configured to permit fluid to flow therethrough, said body including a flange extending circumferentially around the inner periphery of the body, the flange having an inner surface defining a valve aperture; and
   a poppet valve moveably mounted within the valve aperture, said poppet valve including a plurality of guide legs extending through the valve aperture, each of the plurality of guide legs having an outer peripheral surface facing the inner surface defining the valve aperture, wherein outer edges of the outer peripheral surfaces of the plurality of guide legs are recessed such that only a center portion of the outer peripheral surface of each guide leg can come into contact with the inner surface defining the valve aperture.

19. The check valve of claim 18, wherein the recessed edges of the outer peripheral surfaces of the guide legs are cut out.

* * * * *